(12) United States Patent
Arai

(10) Patent No.: US 10,239,442 B2
(45) Date of Patent: Mar. 26, 2019

(54) VEHICULAR LAMP

(71) Applicant: Koito Manufacturing Co., Ltd., Tokyo (JP)

(72) Inventor: Hajime Arai, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 15/467,057

(22) Filed: Mar. 23, 2017

(65) Prior Publication Data

US 2017/0284620 A1 Oct. 5, 2017

(30) Foreign Application Priority Data

Mar. 30, 2016 (JP) .................................. 2016-067826

(51) Int. Cl.

| | |
|---|---|
| *B60Q 1/068* | (2006.01) |
| *F21S 41/19* | (2018.01) |
| *F21S 41/147* | (2018.01) |
| *F21S 41/255* | (2018.01) |
| *F21S 41/26* | (2018.01) |
| *F21S 41/265* | (2018.01) |
| *F21S 41/39* | (2018.01) |
| *F21S 41/32* | (2018.01) |
| *F21S 41/36* | (2018.01) |
| *F21S 41/40* | (2018.01) |
| *F21S 41/50* | (2018.01) |
| *F21S 45/47* | (2018.01) |

(Continued)

(52) U.S. Cl.

CPC .......... *B60Q 1/0683* (2013.01); *F21S 41/147* (2018.01); *F21S 41/192* (2018.01); *F21S 41/255* (2018.01); *F21S 41/26* (2018.01);

*F21S 41/265* (2018.01); *F21S 41/321* (2018.01); *F21S 41/36* (2018.01); *F21S 41/39* (2018.01); *F21S 41/40* (2018.01); *F21S 41/50* (2018.01); *F21S 45/47* (2018.01); *F21S 41/25* (2018.01); *F21S 41/365* (2018.01)

(58) Field of Classification Search

CPC ............... F21S 48/1109; F21S 48/1258; F21S 48/1275; F21S 48/1291; F21S 48/1305; B60Q 1/06

USPC ......................................................... 362/514

See application file for complete search history.

(56) References Cited

U.S. PATENT DOCUMENTS 6,161,950 A * 12/2000 Tsukamoto ............ B60Q 1/076
362/284
6,481,865 B2 * 11/2002 Woerner ................ B60Q 1/085
362/41

(Continued)

FOREIGN PATENT DOCUMENTS

JP 2005-165590 A 6/2005

*Primary Examiner* — Bryon T Gyllstrom

(74) *Attorney, Agent, or Firm* — Abelman, Frayne & Schwab

(57) ABSTRACT

Three lamp units are supported on a bracket supported to be rotatable with respect to a lamp body. In the configuration of the respective lamp units, light source units are supported to be rotatable in an up and down direction with respect to the bracket, and projection lenses are fixedly supported on the bracket. Accordingly, it is possible to correct a misalignment of optical axes among the lamp units by preventing the occurrence of the positional misalignment of the projection lenses among the lamp units and then rotating the respective light source units with respect to the bracket.

9 Claims, 11 Drawing Sheets

(51) Int. Cl.
*F21S 41/25* (2018.01)
*F21S 41/365* (2018.01)

(56) References Cited

U.S. PATENT DOCUMENTS

| | | | | |
|---|---|---|---|---|
| 7,410,282 | B2 * | 8/2008 | Eichelberger | F21V 13/02 |
| | | | | 362/545 |
| 7,766,524 | B2 * | 8/2010 | Naganawa | B60Q 1/085 |
| | | | | 362/544 |
| 7,828,467 | B2 * | 11/2010 | Lee | F21S 8/08 |
| | | | | 362/237 |
| 7,866,847 | B2 * | 1/2011 | Zheng | F21S 2/005 |
| | | | | 362/249.03 |
| 8,210,723 | B2 * | 7/2012 | Peck | F21V 5/007 |
| | | | | 362/235 |
| 2003/0214815 | A1 * | 11/2003 | Ishida | F21S 41/147 |
| | | | | 362/516 |
| 2005/0141235 | A1 * | 6/2005 | Takeda | B60Q 1/12 |
| | | | | 362/545 |
| 2006/0133104 | A1 * | 6/2006 | Okubo | B60Q 1/12 |
| | | | | 362/545 |
| 2007/0279927 | A1 * | 12/2007 | Yamamichi | F21S 41/147 |
| | | | | 362/545 |
| 2009/0122567 | A1 * | 5/2009 | Mochizuki | F21V 13/12 |
| | | | | 362/509 |
| 2010/0232173 | A1 * | 9/2010 | Ohno | F21S 2/005 |
| | | | | 362/538 |
| 2010/0246204 | A1 * | 9/2010 | Inaba | F21S 41/19 |
| | | | | 362/539 |
| 2010/0277939 | A1 * | 11/2010 | Komatsu | F21S 48/1159 |
| | | | | 362/516 |

* cited by examiner

VEHICULAR LAMP

CROSS-REFERENCE TO RELATED APPLICATIONS

This application is based on and claims priority from Japanese Patent Application No. 2016-067826, filed on Mar. 30, 2016, with the Japan Patent Office, the disclosure of which is incorporated herein in its entirety by reference.

TECHNICAL FIELD

The present disclosure relates to a vehicular lamp including a plurality of lamp units.

BACKGROUND

In the related art, a vehicular lamp configured to form a predetermined light distribution pattern by irradiation light emitted from a plurality of lamp units has been known.

Japanese Patent Laid-Open Publication No. 2005-165590 discloses a configuration of such a vehicular lamp in which a bracket is supported to be rotatable with respect to a lamp body, and a plurality of lamp units are supported by the bracket.

Each of the lamp units disclosed in Japanese Patent Laid-Open Publication No. 2005-165590 includes a projection lens, a light source disposed behind the projection lens, and a reflector configured to reflect light from the light source toward the projection lens, and the projection lens and the reflector are configured to be rotatably adjustable.

SUMMARY

In the vehicular lamp disclosed in Japanese Patent Laid-Open Publication No. 2005-165590, as the bracket is rotated with respect to the lamp body, the optical axes of the plurality of lamp units may be collectively adjusted.

In this regard, it is possible to correct a misalignment of the optical axes of the lamp units by rotating and adjusting the projection lenses and the reflectors of the respective lamp units with respect to the bracket, and as a result, it is possible to precisely adjust the optical axes of the plurality of lamp units.

However, in a case in which such a configuration is adopted, the positions of the projection lens and the reflector of each of the lamp units are changed, the appearance of the vehicular lamp may be impaired.

The present disclosure has been made in consideration of the above-described circumstances, and is to provide a vehicular lamp which includes a plurality of lamp units and is capable of precisely adjusting the optical axes of respective lamp units without impairing the appearance of the vehicular lamp.

The present disclosure has been made in an effort to achieve the object by improving a support structure of a lamp unit.

That is, a vehicular lamp according to the present disclosure is configured to form a predetermined light distribution pattern by irradiation light from a plurality of lamp units. The vehicular lamp includes a bracket supported to be rotatable with respect to a lamp body, the plurality of lamp units are supported on the bracket, each of the lamp units includes a light source unit, and a light control member configured to control light from the light source unit. In at least some lamp units among the plurality of lamp units, the light source unit is supported to be rotatable with respect to the bracket, and the light control member is fixedly supported on the bracket.

The kind of the "predetermined light distribution pattern" is not particularly limited. For example, it is possible to adopt a light distribution pattern that forms a light distribution pattern for a low beam or a portion thereof, a light distribution pattern that forms a light distribution pattern for a high beam or a portion thereof, a light distribution pattern for a daytime running lamp, and a light distribution pattern for a fog lamp.

The specific configuration of the "lamp units" is not particularly limited as long as each of the lamp units includes a light source unit and a light control member. For example, it is possible to adopt a configuration in which a light source and a reflector are provided as the "light source unit" and a projection lens is provided as the "light control member," a configuration in which a light source is provided as the "light source unit" and a projection lens is provided as the "light control member", and a configuration in which a light source is provided as the "light source unit" and a reflector is provided as the "light control member."

The specific configuration of the "bracket" is not particularly limited as long as the bracket is a member supported to be rotatable with respect to the lamp body. Further, the specific rotation direction in that event is not particularly limited as well.

The "at least some lamp units" are configured such that the light source unit is supported to be rotatable with respect to the bracket, but in this regard, a specific rotation direction is not particularly limited.

The vehicular lamp according to the present disclosure is configured such that the bracket is supported to be rotatable with respect to the lamp body and the plurality of lamp units is supported on the bracket, but in at least some lamp units of the plurality of lamp units, the light source unit is supported to be rotatable with respect to the bracket, and the light control member is fixedly supported on the bracket. As a result, operational effects may be obtained as follows.

That is, it is possible to collectively adjust the optical axes of the plurality of lamp units by rotating the bracket.

Thereafter, in respect to at least some lamp units, it is possible to correct a misalignment of optical axes among the lamp units by rotating the light source units thereof with respect to the bracket. In addition, this enables the optical axes to be precisely adjusted with respect to the plurality of lamp units.

In this regard, since all the light control members of the respective lamp units are fixedly supported on the bracket, it is possible to suppress the appearance of the vehicular lamp from being impaired without any possibility of causing a positional misalignment of a light control member among the lamp units.

As a result, according to the present disclosure, in the vehicular lamp including a plurality of lamp units, it is possible to precisely adjust the optical axes of the respective lamp units without impairing then appearance of the vehicular lamp.

When all the light control members of the plurality of lamp units are configured with projection lenses in the above-described configuration, it is possible to reduce the number of components, and thus to increase the precision of a position relationship between the projection lenses when the plurality of projection lenses are configured with a single transparent member.

When the plurality of projection lenses is configured with the single transparent member, the single transparent member has a very heavy weight. However, since the transparent member is fixedly supported on the bracket, it is possible to implement a lamp configuration that does not have a problem in terms of strength.

In that event, when the front surface of the transparent member is configured as a continuous curved or flat surface, it is possible to make the presence of the plurality of projection lenses inconspicuous when viewing the vehicular lamp from the outside. As a result, it is possible to improve the appearance of the vehicular lamp.

When the above-described configuration is provided with an extension member be disposed to surround the light control members of the plurality of lamp units, it is possible to improve the appearance of the vehicular lamp. In that event, when the extension member is configured to be fixedly supported on the bracket, it is possible to constantly maintain an interval between the respective light control members and the extension member so that the appearance of the vehicular lamp can be further improved.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

In the following detailed description, reference is made to the accompanying drawing, which form a part hereof. The illustrative embodiments described in the detailed description, drawing, and claims are not meant to be limiting. Other embodiments may be utilized, and other changes may be made, without departing from the spirit or scope of the subject matter presented here.

Hereinafter, exemplary embodiments of the present disclosure will be described with reference to the drawings.

Figure 1:
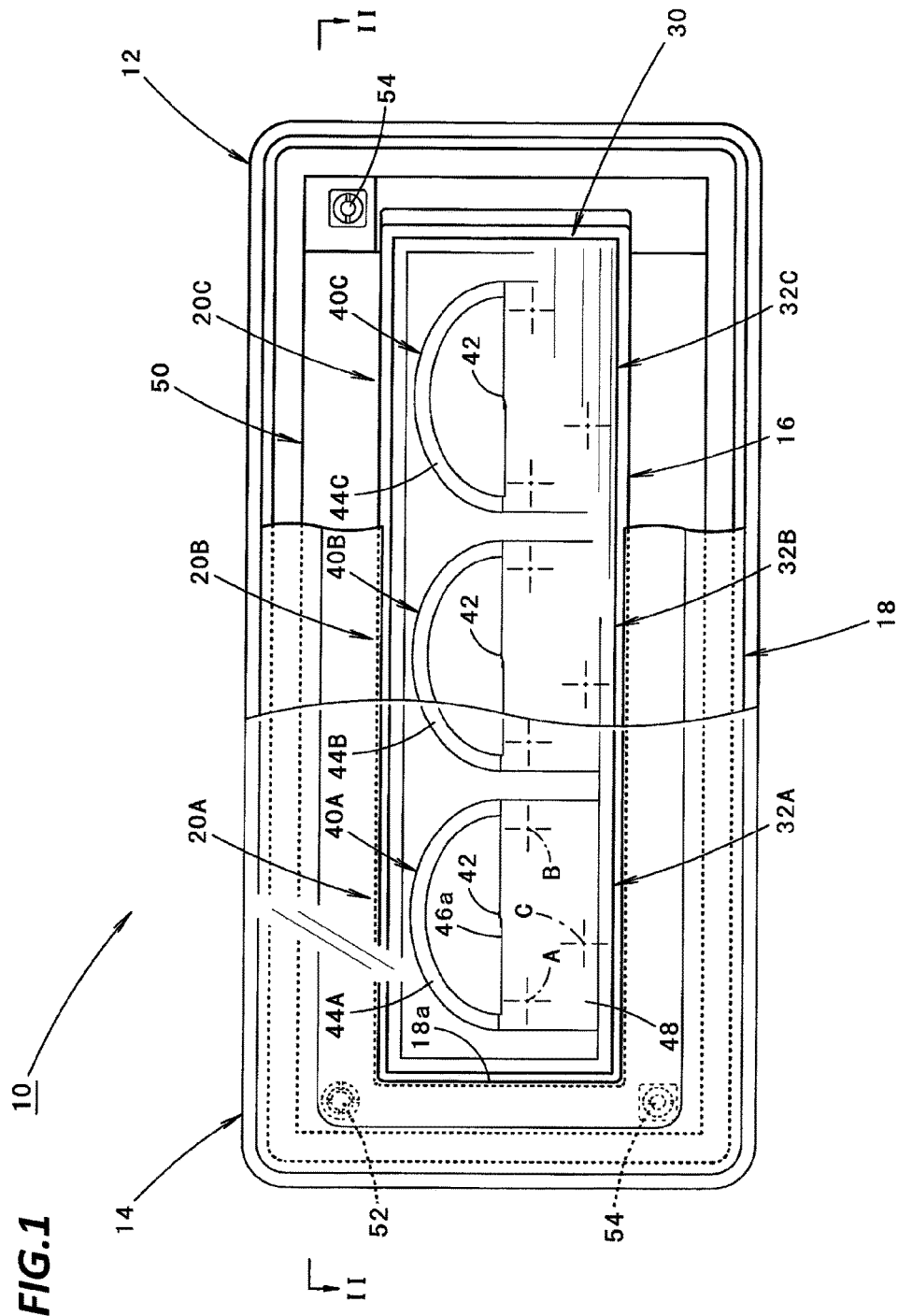
FIG. 1 is a front view illustrating a vehicular lamp according to an exemplary embodiment of the present disclosure.

FIG. 1 is a front view illustrating a vehicular lamp 10 according to an exemplary embodiment of the present disclosure. In addition, FIG. 2 is a cross-sectional view taken along line II-II in FIG. 1.

As illustrated in these drawings, the vehicular lamp 10 according to the present exemplary embodiment is a head lamp disposed at a left front end portion of a vehicle, and is configured to be able to form a light distribution pattern for a low beam.

Figure 2:
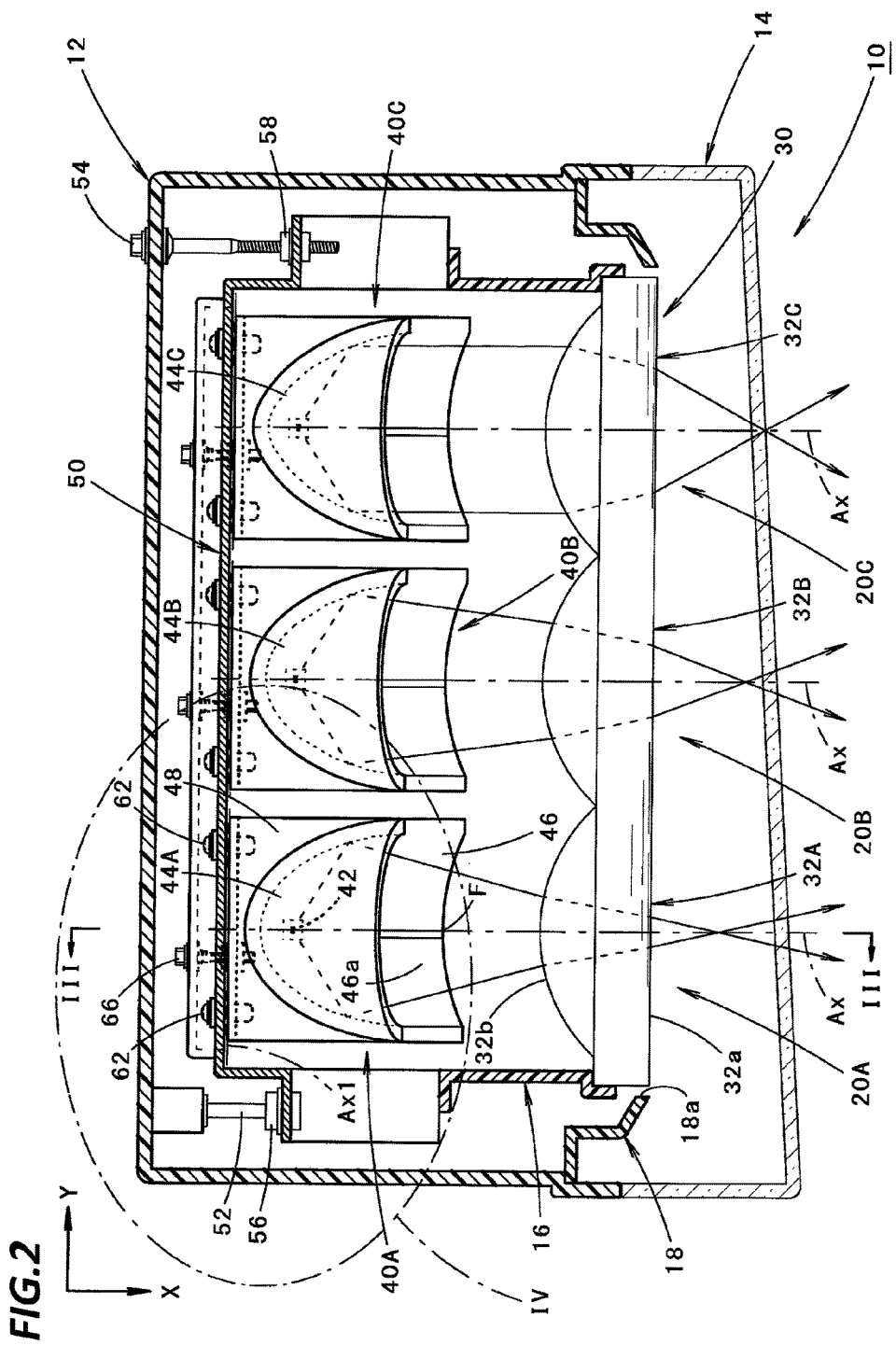
FIG. 2 is a cross-sectional view taken along line II-II in FIG. 1.

In the vehicular lamp 10, as illustrated in FIG. 2, a direction indicated by X is a front direction (a front direction even based on the vehicle), and a direction indicated by Y is a left direction orthogonal to the front direction (a left direction even based on the vehicle). That is, the direction indicated by Y is a right direction in the front view of the lamp.

The vehicular lamp 10 is configured such that three lamp units 20A, 20B, and 20C are accommodated in parallel in a vehicle width direction within a lamp chamber defined by a lamp body 12 and a transparent light transmitting cover 14 mounted on the front end opening of the lamp body 12.

The lamp units 20A, 20B, and 20C are configured to have projection lenses 32A, 32B, and 32C as light control members, and light source units 40A, 40B, and 40C disposed at the rear sides of the projection lenses 32A, 32B, and 32C, respectively.

A bracket 50 is disposed in the lamp chamber and supported to be rotatable with respect to the lamp body 12.

The three light source units 40A to 40C are supported to be rotatable with respect to the bracket 50 (this feature will be described in detail below).

The three projection lenses 32A to 32C are disposed in parallel in the vehicle width direction, and all of the projection lenses 32A to 32C have the same configuration.

Specifically, each of the projection lenses 32A to 32C has a front surface 32a that configured as a convex cylindrical surface horizontally extending in the vehicle width direction, and a rear surface 32b that is configured as a convex cylindrical surface extending in an up and down direction. In this regard, a vertical cross-sectional shape of the front surface 32a and a horizontal cross-sectional shape of the rear surface 32b are set to curved shapes having the same curvature.

Each of the projection lenses 32A to 32C has an optical axis Ax extending in a front and rear direction of the vehicle to pass through the central position of the front surface 32a in the up and down direction and the central position of the rear surface 32b in the vehicle width direction.

The three projection lenses 32A to 32C are configured with a single transparent member 30. The transparent member 30 is disposed to extend along a horizontal plane in the vehicle width direction, and has an external appearance having a horizontally oblong rectangular shape in the front view of the lamp.

The front surface of the transparent member 30 is formed such that the front surfaces 32a of the three projection lenses 32A to 32C form a continuous single convex cylindrical surface.

The transparent member 30 is fixedly supported on a lens holder 16 at the outer peripheral edge portions thereof. The lens holder 16 is fixedly supported on the bracket 50 at the left and right end portions thereof.

An extension member 18, which covers the lens holder 16, is disposed the outer peripheral side of the lens holder 16. The extension member 18 has a front end opening 18a that surrounds the transparent member 30 such that a substantially constant gap is formed between the front end opening 18a and the transparent member 30 in the front view of the lamp. Further, the rear end portion of the extension member 18 is fixedly supported on the lamp body 12.

The bracket 50 is supported to be rotatable in the up and down direction and in a left and right direction with respect to the lamp body 12 by a pivot 52 positioned at a right upper side (a left upper side in the front view of the lamp) and two aiming screws 54 positioned at a left upper side and a right lower side.

A base end portion of the pivot 52 is fixed to the lamp body 12, and the tip portion of the pivot 52 is engaged with a spherical step bearing 56 mounted on the bracket 50. In addition, a base end portion of each aiming screw 54 is rotatably supported on the lamp body 12, and a tip portion of the aiming screw 54 is thread-coupled to an aiming nut 58 mounted on the bracket 50.

The configurations of the light source units 40A to 40C of the three lamp units 20A to 20C may be partially different from each other, but all of the basic configurations are substantially identical to each other.

Therefore, hereinafter, a specific configuration of the lamp unit 20A positioned at the right end will be described below.

Figure 3:
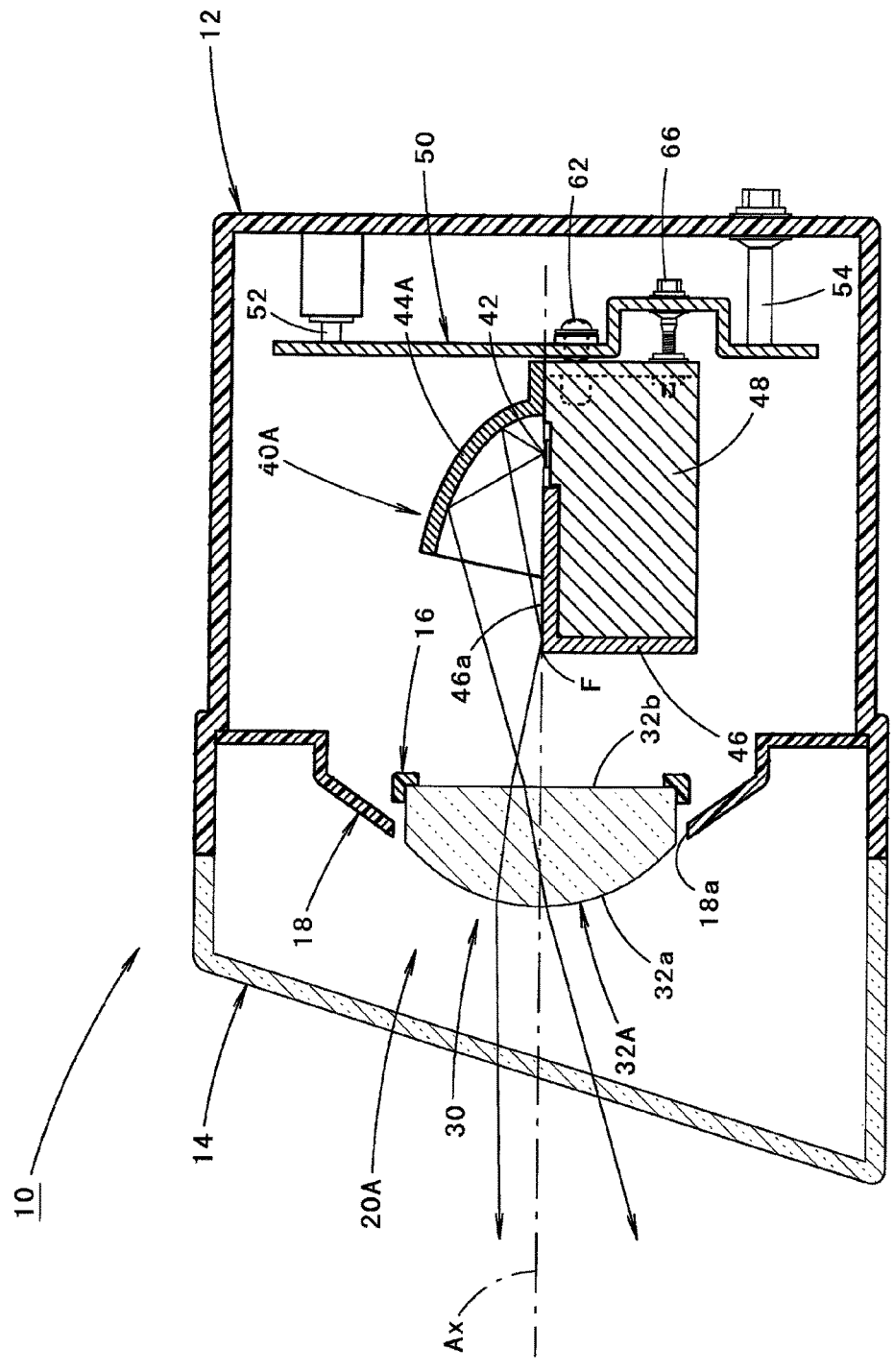
FIG. 3 is a cross-sectional view taken along line in FIG. 2.

FIG. 3 is a cross-sectional view taken along line in FIG. 2.

As illustrated in FIG. 3, the light source unit 40A of the lamp unit 20A includes a light source 42 disposed at the rear side from the rear focal point F of the projection lens 32A, a reflector 44A configured to reflect emission light emitted from the light source 42 toward the projection lens 32A, a shade 46 configured to shield a part of the light reflected from the reflector 44A, and a base member 48 configured to support the light source 42, the reflector 44A, and the shade 46.

The light source 42 is a white light emitting diode having a horizontally oblong rectangular light emitting surface. The light source 42 is supported on the top surface of the base member 48 in a state in which a light emitting surface of the light source 42 faces upward. The reflector 44A is disposed to cover the top side of the light source 42, and configured to reflect the light from the light source 42 forward in a direction close to the optical axis Ax. The shade 46 has an upward reflecting surface 46a which reflects a part of the reflected light from the reflector 44A upward and allows the light to enter the projection lens 32A. A front end edge of the upward reflecting surface 46a is formed to extend toward the left and right sides from the rear focal point F.

The light source unit 40A is supported on the bracket 50 at the rear end surface of the base member 48. Further, the base member 48 is provided with a cooling fin (not illustrated) such that the base member 48 also functions as a heat sink.

As illustrated in FIG. 2, the configurations of reflectors 44B and 44C of the light source units 40B and 40C of the remaining two lamp units 20B and 20C are different from that of the light source unit 40A of the lamp unit 20A.

That is, in the case of the lamp unit 20B positioned at the center, the shape of a reflecting surface of the reflector 44B of the light source unit 40B is set such that the convergence degree of the light, which is emitted from the light source 42 and reflected by the reflector 44B, is smaller than the convergence degree of the light, which is emitted from the light source 42 and reflected by the reflector 44A of the light source unit 40A.

In the case of the lamp unit 20C positioned at the left end, the shape of the reflecting surface of the reflector 44C of the light source unit 40C is set such that the convergence degree of the light, which is emitted from the light source 42 and reflected by the reflector 44C, is much smaller than the convergence degree of the light, which is emitted from the light source 42 and reflected by the reflector 44B of the light source unit 40B.

Figure 4:
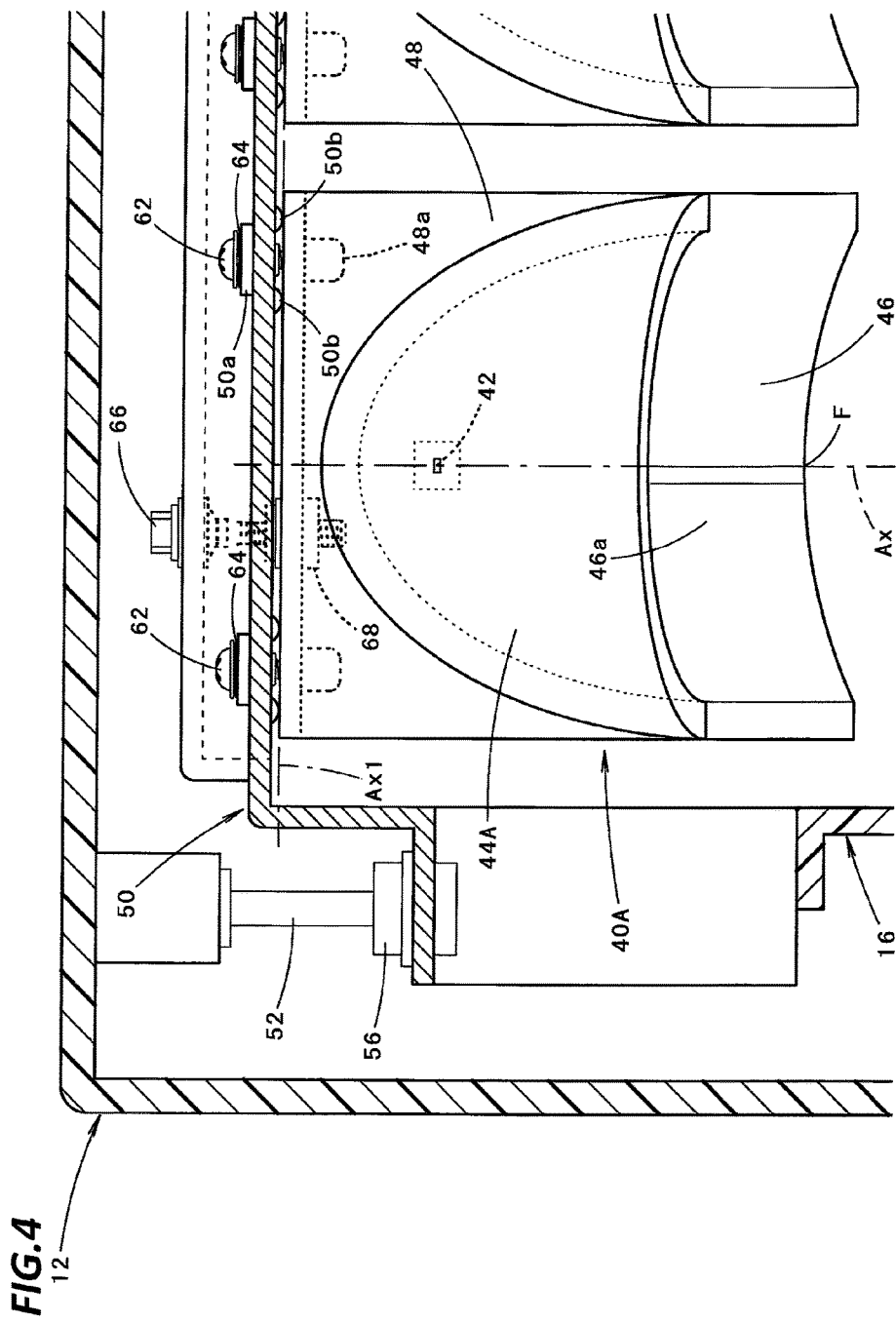
FIG. 4 is a detailed view of part IV in FIG. 2.

FIG. 4 is a detailed view of part IV in FIG. 2.

As illustrated in FIG. 4, the light source unit 40A of the lamp unit 20A is supported to be rotatable in the up and down direction with respect to the bracket 50 about a rotation axis Ax1 that horizontally extends in the vehicle width direction.

The light source unit 40A is fastened to the bracket 50 by screw fastening at two points (positions thereof are indicated by points A and B in FIG. 1) in a direction where the rotation axis Ax1 extends.

A waved washer 64, which is elastically deformable in the screw fastening direction, is mounted on the screw 62 that is used for the screw fastening.

In the bracket 50, sleeves 50a are formed at the two points in the direction where the rotation axis Ax1 extends. Each sleeve 50a is formed to protrude rearward from the bracket 50, and the inner circumferential surface of the sleeve 50a defines an insertion hole through which the screw 62 is inserted.

In addition, projections 50b are formed at four points of the bracket 50 in the direction where the rotation axis Ax1 extends, in which the projections 50b are abutted on the base member 48 of the light source unit 40A so as to permit the light source unit 40A to rotate in the up and down direction. Among the four projections 50b, a pair of projections 50b are formed in the vicinity of the opposite sides of each of the insertion holes in the direction in which the rotation axis Ax1 extends. The respective projections 50b are substantially hemispherical projections that are formed to have substantially the same size.

On the rear end surface of the base member 48 of the light source unit 40A, boss portions 48a are formed at two points in the direction where the rotation axis Ax1 extends, so as to be thread-coupled to and fix the threaded portions of the screws 62, respectively.

Meanwhile, an adjusting screw 66 is disposed at a position below the rotation axis Ax1 (a position of the adjusting screw 66 is indicated by point C in FIG. 1) so as to allow the light source unit 40A to rotate in the up and down direction with respect to the bracket 50 about the rotation axis Ax1.

A base end portion of the adjusting screw 66 is rotatably supported on the bracket 50, and a tip portion of the adjusting screw 66 is thread-coupled to an adjusting nut 68 mounted on the base member 48.

The same is applied to the light source units 40B and 40C of the remaining two lamp units 20B and 20C.

In addition, it is possible to correct a misalignment of the optical axes in the up and down direction among the respective light source units 40A to 40C by operating the adjusting screws 66 and rotating the respective light source units 40A to 40C in the up and down direction with respect to the bracket 50 in a state in which the respective light source units 40A to 40C are assembled to the bracket 50. The operation may be performed in a step prior to assembling the bracket 50 to the lamp body 12.

The bracket 50 is formed such that the portion, which supports the base end portion of the adjusting screw 66 of each of the light source units 40A to 40C, is formed to be displaced to the rear side from the portion which is formed with the sleeve 50a.

Figure 5:
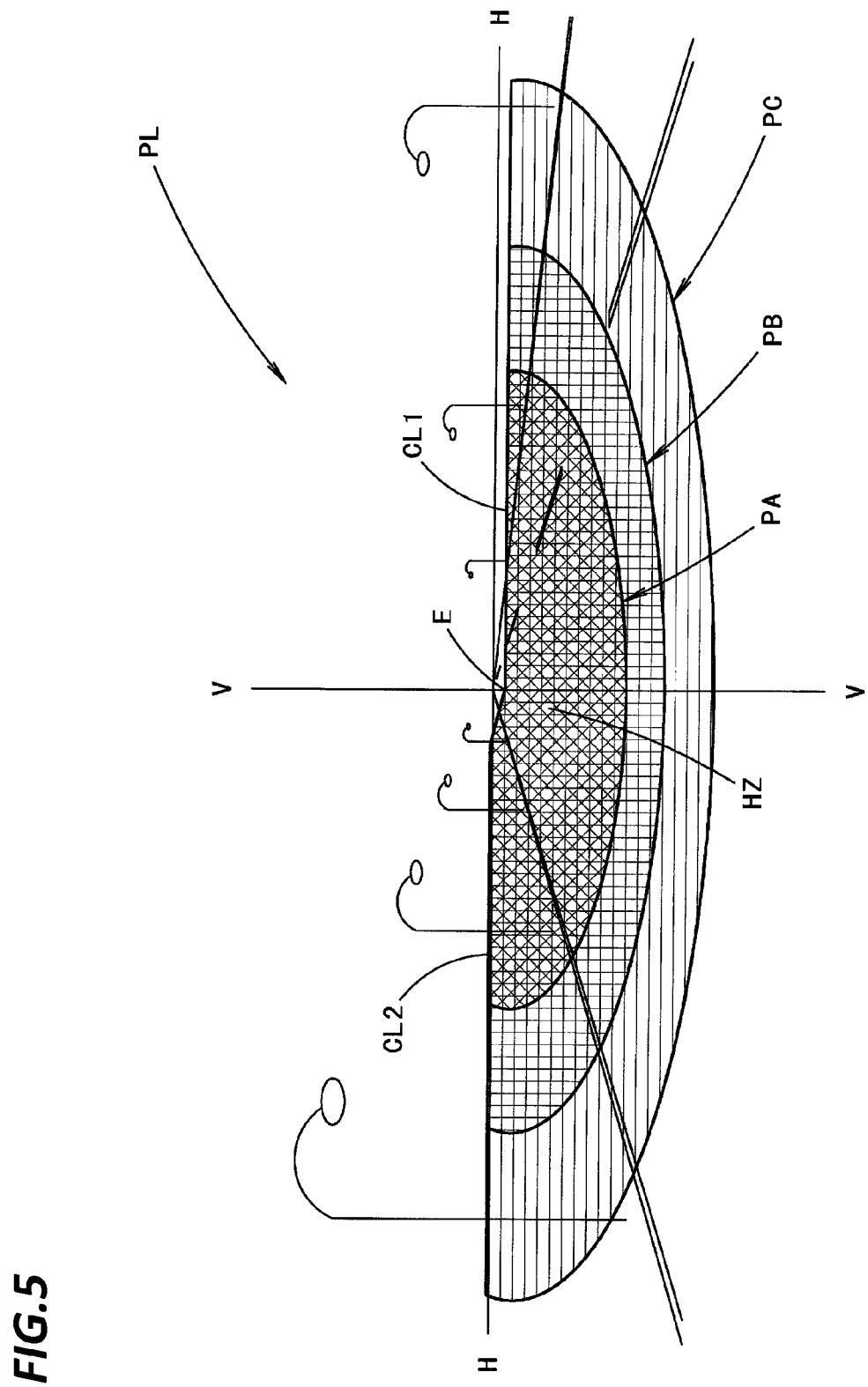
FIG. 5 is a view illustrating a light distribution pattern for a low beam formed by irradiation light from the vehicular lamp.

FIG. 5 is a view isometrically illustrating a light distribution pattern PL for a low beam formed on an imaginary vertical screen disposed 25 m ahead of the front side of the vehicle by irradiation light projected from the vehicular lamp 10.

The light distribution pattern PL for a low beam is a light distribution pattern for a low beam of the left light distribution, and has uneven left and right cutoff lines CL1 and CL2 at the top end edge thereof. The cutoff lines CL1 and CL2 extend in the horizontal direction with different left and right levels with reference to a boundary line V-V that vertically passes through a varnishing point H-V in the front direction of the lamp, a counter lane side portion, which is positioned at the right side of the line V-V, is formed as a lower step cutoff line CL1, and an own lane side portion, which is positioned at the left side of the line V-V, is formed as an upper step cutoff line CL2 stepped upward through an inclined portion from the lower cutoff line CL1.

In the light distribution pattern PL for a low beam, an elbow point E, which is an intersection point between the lower step cutoff line CL1 and the line V-V, is positioned about 0.5 to 0.6° below the point H-V.

The light distribution pattern PL for a low beam is formed as a synthesized light distribution pattern in which three light distribution patterns PA, PB, and PC overlap with each other.

The light distribution pattern PA is a light distribution pattern formed by the irradiation light projected from the lamp unit 20A, the light distribution pattern PB is a light distribution pattern formed by the irradiation light projected from the lamp unit 20B, and the light distribution pattern PC is a light distribution pattern formed by the irradiation light projected from the lamp unit 20C.

The light distribution pattern PA is formed by projecting an image of the light source 42, which is formed on the rear focal surface of the projection lens 32A by the light emitted from the light source 42 and reflected by the reflector 44 of the lamp unit 20A, as a reversed projection image on the imaginary vertical screen by the projection lens 32A, and the cutoff lines CL1 and CL2 of the light distribution pattern PA are formed as a reversed projection image of the front end edge of the upward reflecting surface 46a of the shade 46. The same is also applied to the remaining two light distribution patterns PB and PC.

All the three light distribution patterns PA, PB, and PC are formed as horizontally oblong light distribution patterns that are uniformly widened in the left and right direction with respect to the line V-V that vertically passes through the varnishing point H-V in the front direction of the lamp. In that event, the light distribution pattern PA is formed as a small and bright light distribution pattern, the light distribution pattern PB is formed as a light distribution pattern that is not as bright as the light distribution pattern PA but is larger than the light distribution pattern PA, and the light distribution pattern PC is formed as a light distribution pattern that is not as bright as the light distribution pattern PB but is larger than the light distribution pattern PB.

This is due to the fact that the convergence degree of the light reflected from the reflector 44B of the lamp unit 20B is smaller than the convergence degree of the light reflected from the reflector 44A of the lamp unit 20A, and the convergence degree of the reflected light from the reflector 44C of the lamp unit 20C is much smaller than the convergence degree of the reflected light from the reflector 44.

Since the light distribution pattern PL for a low beam is configured by the three light distribution patterns PA, PB, and PC which are uniformly widened in the left and right direction with respect to the line V-V and have different brightness and different sizes, the light distribution pattern PL for a low beam is formed as a light distribution pattern having a less uneven light distribution that has a highly luminous intensity region HZ in the front direction of the lamp, and as a result, a forward traveling road for the vehicle is illuminated widely and uniformly in the left and right direction.

The light distribution pattern PL for a low beam is formed as a light distribution pattern in which the positions of the cutoff lines CL1 and CL2 of the three light distribution patterns PA, PB, and PC are aligned in the up and down direction. This is realized by correcting the misalignment of the optical axes in the up and down direction among the light source units 40A to 40C by rotating the respective light source units 40A to 40C with respect to the bracket 50 in the up and down direction in a state in which the three light source units 40A to 40C are assembled to the bracket 50.

Next, the acting effects of the present exemplary embodiment will be described.

The vehicular lamp 10 according to the present exemplary embodiment is configured such that the bracket 50 is supported to be rotatable in the up and down direction and in the left and right direction with respect to the lamp body 12, and the three lamp units 20A, 20B, and 20C are supported on the bracket 50. However, the light source units 40A, 40B, and 40C of all the three lamp units 20A to 20C are supported to be rotatable in the up and down direction with respect to the bracket 50, and the projection lenses 32A, 32B, and 32C (the light control members) are fixedly supported on the bracket 50. As a result, the following acting effects may be obtained.

That is, it is possible to collectively adjust the optical axes with respect to the three lamp units 20A to 20C by rotating the bracket 50.

It is possible to correct the misalignment of the optical axes in the up and down direction among the lamp units 20A to 20C by rotating the light source units 40A to 40C of the respective lamp units 20A to 20C with respect to the bracket 50. As a result, it is possible to precisely adjust the optical axes with respect to the three lamp units 20A to 20C.

In that event, since all the projection lenses 32A to 32C of the respective lamp units 20A to 20C are fixedly supported on the bracket 50, it is possible to prevent the appearance of the vehicular lamp 10 from being impaired without any possibility of causing a positional misalignment of the projection lenses 32A to 32C among the lamp units 20A to 20C.

As a result, according to the present exemplary embodiment, it is possible to precisely adjust the optical axes of the respective lamp units 20A to 20C without impairing the appearance of the vehicular lamp 10 including the three lamp units 20A to 20C.

In that event, since the projection lenses 32A to 32C of the three lamp units 20A to 20C in the present exemplary embodiment are configured with a single transparent member 30, it is possible to reduce the number of components, and to improve the precision of a positional relationship among the projection lenses 32A to 32C.

In a case in which the three projection lenses 32A to 32C are configured with the single transparent member 30, the single transparent member 30 has a very heavy weight. However, since the transparent member 30 is fixedly supported on the bracket 50, it is possible to implement a lamp configuration having no problem in respect to strength.

Since the front surface of the transparent member 30 is configured as a continuous curved surface, it is possible to make the presence of the three projection lenses 32A to 32C inconspicuous when viewing the vehicular lamp 10 from the outside, and as a result, it is possible to improve the appearance of the vehicular lamp 10.

In the present exemplary embodiment, since the extension member 18, which is disposed to surround the transparent member 30, is provided, it is possible to further improve the appearance of the vehicular lamp 10.

In that event, since the optical axes of the three lamp units 20A to 20C are collectively adjusted in a state in which the misalignment of the optical axes in the up and down direction among the lamp units 20A to 20C is corrected in advance, it is possible to reduce the rotation amount required to adjust the optical axes. As a result, it is possible to prevent the transparent member 30 and the front end opening 18a of the extension member 18 from interfering with each other when adjusting the optical axes even though a gap between the transparent member 30 and the front end opening 18a of the extension member 18 is formed to be comparatively narrow.

In the exemplary embodiment, it has been described that the convex cylindrical surface, which constitutes the front surface 32a of the respective projection lenses 32A to 32C, and the convex cylindrical surface, which constitutes the rear surface 32b of the respective projection lenses 32A to 32C, are set to curved shapes that have the same curvature. However, the convex cylindrical surfaces may be set to curved shapes that have different curvatures.

In the exemplary embodiment, it has been described that the respective projection lenses 32A to 32C have the front surface 32a configured as the convex cylindrical surface extending in the vehicle width direction, and the rear surface 32b configured as the convex cylindrical surface extending in the up and down direction. However, the respective projection lenses 32A to 32C may have any configuration (e.g., a planoconvex lens, a biconvex lens, etc.) other than the aforementioned configurations. In this regard, in the exemplary embodiment, it has been described that the front surface of the transparent member 30 is configured as a continuous curved surface. However, the front surface may be configured as a continuous flat surface.

In the exemplary embodiment, it has been described that the extension member 18 is fixedly supported on the lamp body 12. However, the extension member 18 may be configured to be fixedly supported on the light transmitting cover 14.

In the exemplary embodiment, it has been described that the vehicular lamp 10 includes the three lamp units 20A, 20B, and 20C. However, the vehicular lamp 10 may be configured to have two or more or four or more lamp units.

Next, modified embodiments of the exemplary embodiment will be described.

First, a first modified embodiment of the exemplary embodiment will be described.

Figure 6:
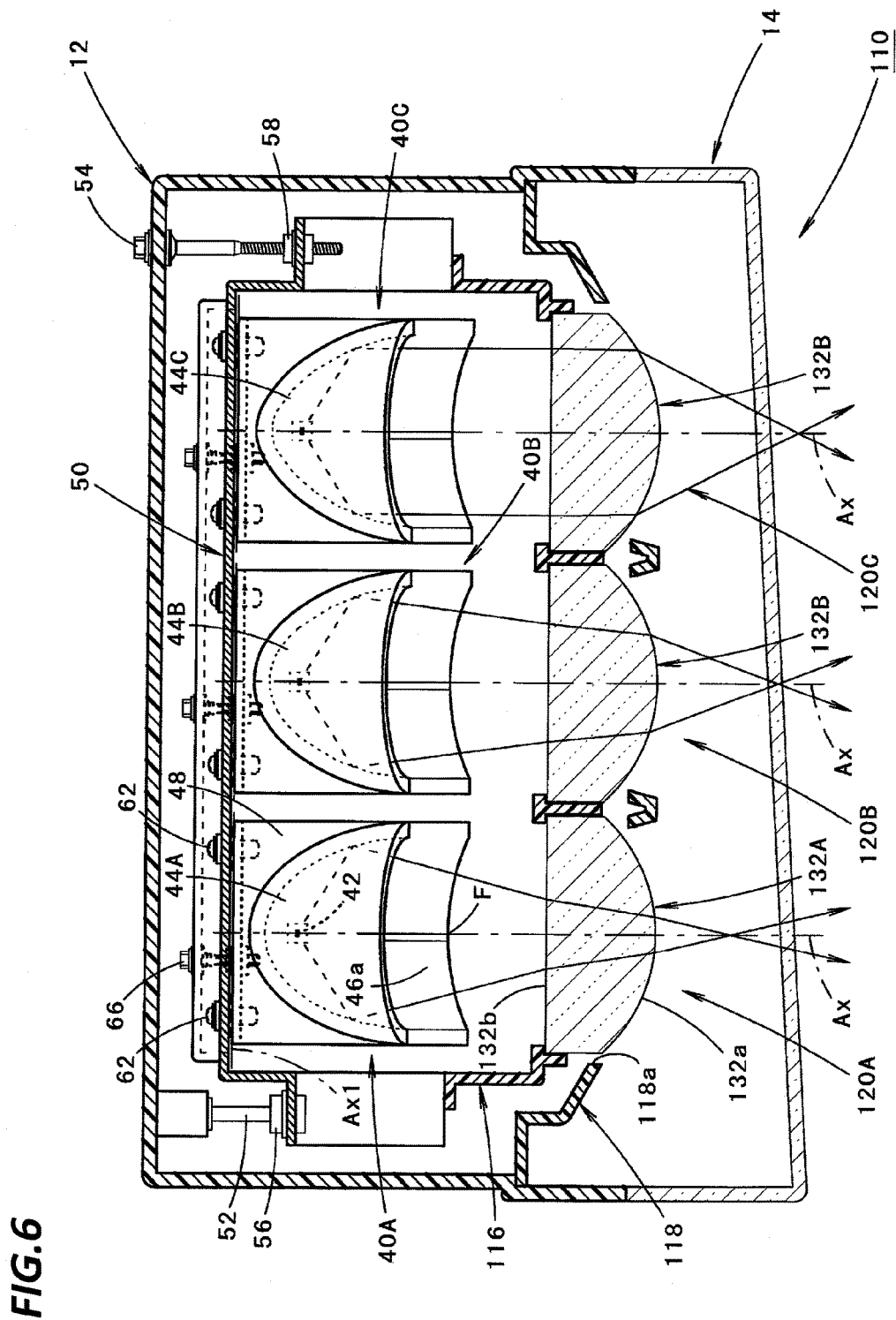
FIG. 6 is a view similar to FIG. 2 and illustrates a first modified embodiment of the exemplary embodiment.

FIG. 6 is a view similar to FIG. 2, and illustrates a vehicular lamp 110 according to the present modified embodiment.

As illustrated in FIG. 6, a basic configuration of the vehicular lamp 110 is substantially identical to that of the vehicular lamp 10 according to the exemplary embodiment, but differs from the exemplary embodiment in that projection lenses 132A, 132B, and 132C of three lamp units 120A, 120B, and 120C are configured with independent projection lenses, and the projection lenses 132A, 132B, and 132C are supported on the lamp body 12 through a lens holder 116 in common.

Each of the projection lenses 132A to 132C is configured with a planoconvex lens of which the front surface 132a is formed in a spherical shape and the rear surface 132b is formed in a flat shape.

The lens holder 116 is formed to surround the respective projection lenses 132A to 132C, and left and right end portions of the lens holder 116 are supported on the lamp body 12.

An extension member 118 is disposed at the outer peripheral side of the lens holder 116 to cover the lens holder 116. The extension member 118 has three front end openings 118a which surround the respective projection lenses 132A to 132C such that a substantially constant gap is formed between the front end openings 118a and the respective projection lenses 132A to 132C in the front view of the lamp. Further, the rear end portion of the extension member 118 is supported on the lamp body 12.

As in the exemplary embodiment, even in the case in which the configuration of the present modified embodiment is adopted, it is possible to precisely adjust the optical axes of the respective lamp units 120A to 120C without impairing the appearance of the vehicular lamp 110.

In the present modified embodiment, it has been described that the three projection lenses 132A, 132B, and 132C are supported on the lamp body 12 through the lens holder 116 in common. However, each of the projection lenses 132A, 132B, and 132C may be configured to be supported on the lamp body 12 through a separate lens holder.

Next, a second modified embodiment of the exemplary embodiment will be described.

Figure 7:
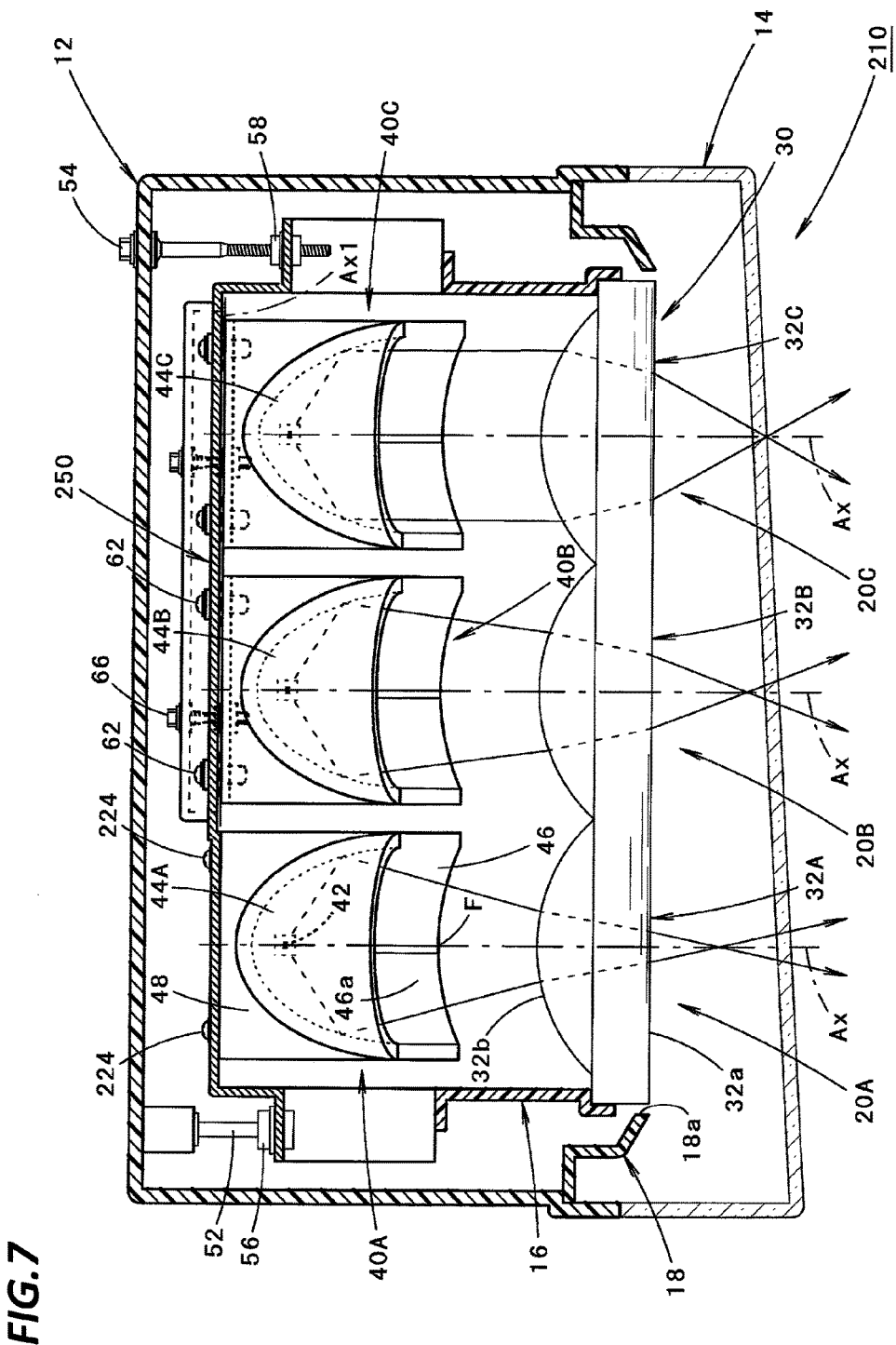
FIG. 7 is a view similar to FIG. 2 and illustrates a second modified embodiment of the exemplary embodiment.

FIG. 7 is a view similar to FIG. 2 and illustrates a vehicular lamp 210 according to the present modified embodiment.

As illustrated in FIG. 7, a basic configuration of the vehicular lamp 210 is substantially identical to that of the vehicular lamp 10 according to the exemplary embodiment, but differs from the exemplary embodiment in that among the light source units 40A, 40B, and 40C of the three lamp units 20A, 20B, and 20C, the light source unit 40A of the lamp unit 20A positioned at the right end portion is fixedly supported on a bracket 250.

That is, in the present modified embodiment, the light source unit 40A is thread-coupled and fixed to the bracket 250 by screws 224 at a plurality of points of a rear end surface of the base member 48. For this reason, the bracket 250 of the present modified embodiment is partially different in shape from the bracket 50 of the exemplary embodiment.

As in the exemplary embodiment, the light source units 40B and 40C of the remaining two lamp units 20B and 20C are supported to be rotatable in the up and down direction with respect to the bracket 250 about the rotation axis Ax1 that horizontally extends in the vehicle width direction.

Even in the case in which the configuration of the present modified embodiment is adopted, when the optical axes of the remaining two lamp units 20B and 20C are adjusted with reference to the optical axes Ax of the lamp unit 20A, it is possible to obtain an operational effect substantially identical to that in the exemplary embodiment while the lamp configuration is more simplified than that in the exemplary embodiment.

Next, a third modified embodiment of the exemplary embodiment will be described.

Figure 8:
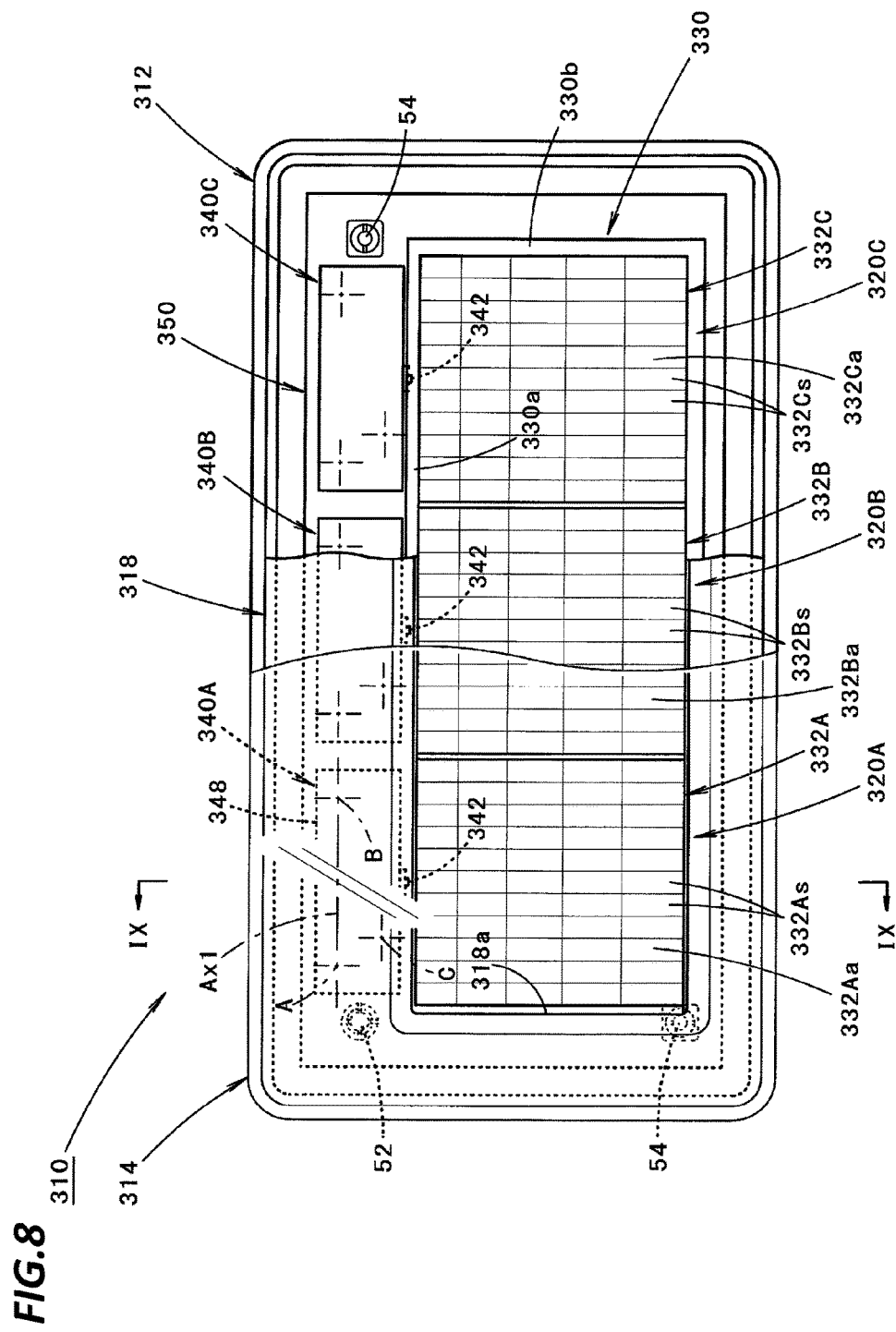
FIG. 8 is a view similar to FIG. 1 and illustrates a third modified embodiment of the exemplary embodiment.

FIG. 8 is a view similar to FIG. 1 and illustrates a vehicular lamp 310 according to the present modified embodiment.

As illustrated in FIG. 8, like the vehicular lamp 10 according to the exemplary embodiment, the vehicular lamp 310 is also configured such that three lamp units 320A, 320B, and 320C are accommodated in parallel in the vehicle width direction within a lamp chamber defined by a lamp body 312 and a light transmitting cover 314. However, the configurations of the respective lamp units 320A, 320B, and 320C are greatly different from those of the exemplary embodiment.

That is, the respective lamp units 320A, 320B, and 320C are configured to include reflectors 332A, 332B, and 332C as light control members, and light source units 340A, 340B, and 340C disposed above the reflectors 332A, 332B, and 332C.

The three reflectors 332A, 332B, and 332C are integrally formed as a reflector continuous body 330, and fixedly supported on the bracket 350.

The three light source units 340A to 340C are supported to be rotatable with respect to the bracket 350 (this feature will be described below in detail).

The bracket 350 is supported to be rotatable in the up and down direction and in a left and right direction with respect to the lamp body 312 by a pivot 52 positioned at a right upper side and two aiming screws 54 positioned at a left upper side and a right lower side.

The configurations of the reflectors 332A, 332B, and 332C of the three lamp units 320A, 320B, and 320C are partially different from each other, but all the basic configurations are substantially identical to each other.

Here, a specific configuration of the lamp unit 320A positioned at a right end portion will be described below.

Figure 9:
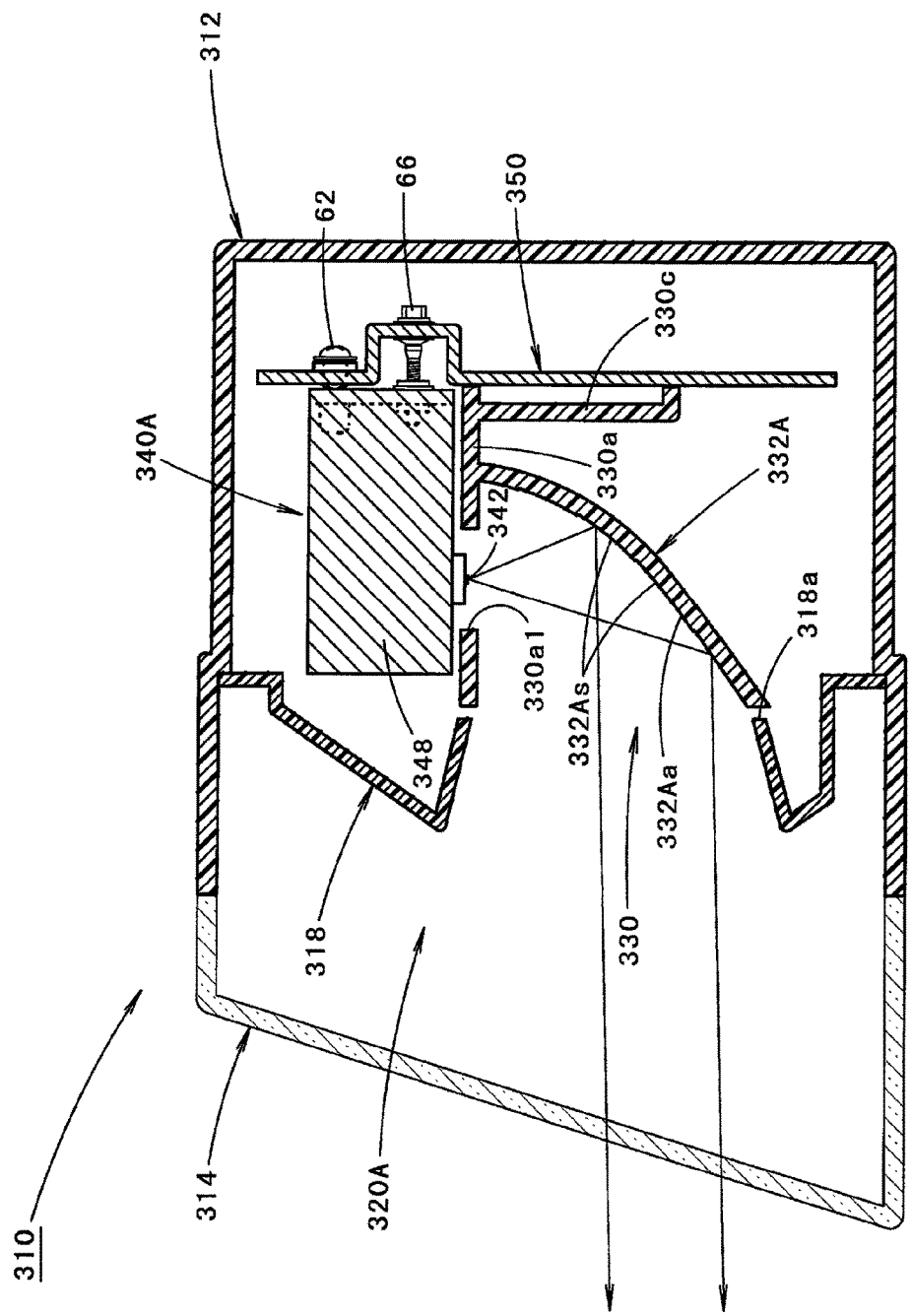
FIG. 9 is a cross-sectional view taken along line IX-IX in FIG. 8.

FIG. 9 is a cross-sectional view taken along line IX-IX in FIG. 8.

As illustrated in FIG. 9, the light source unit 340A of the lamp unit 320A includes a light source 342, and a base member 348 configured to support the light source 342.

The light source 342 is a white light emitting diode having a horizontally oblong rectangular light emitting surface, and the light source 342 is supported on a lower surface of the base member 348 in a state in which a light emitting surface of the light source 342 faces downward.

The light source unit 340A is supported on the bracket 350 at the rear end surface of the base member 348. Further, the base member 348 is provided with a cooling fin (not illustrated), so that the base member 348 may also function as a heat sink.

In that event, the light source unit 340A is supported to be rotatable in the up and down direction with respect to the bracket 350 about the rotation axis Ax1 that horizontally extends in the vehicle width direction.

The light source unit 340A is fastened to the bracket 350 by screw fastening by screws 62, which are substantially identical to the screws 62 in the exemplary embodiment, at two points (positions thereof are indicated by points A and B in FIG. 8) in the direction in which the rotation axis Ax1 extends. In addition, an adjusting screw 66, which is substantially identical to the adjusting screw 66 in the exemplary embodiment and rotates the light source unit 340A in the up and down direction about the rotation axis Ax1 with respect to the bracket 350, is disposed at a position lower than the rotation axis Ax1 (a position of the adjusting screw 66 is indicated by point C in FIG. 8).

The same is applied to the light source units 340B and 340C of the remaining two lamp units 320B and 320C.

In addition, it is possible to correct an misalignment of the optical axes in the up and down direction among the respective light source units 340A to 340C by changing the direction of the light source 342 by operating the adjusting screws 66 and rotating the respective light source units 340A to 340C in the up and down direction with respect to the bracket 350 in a state in which the respective light source units 340A to 340C are assembled to the bracket 350. The operation may be performed in a step prior to assembling the bracket 350 to the lamp body 312.

In addition, the bracket 350 is formed such that the portion supporting the base end portion of the adjusting screw 66 of each of the light source units 340A to 340C is formed to be displaced to the side behind the other portions.

The reflector 332A is configured such that a reflecting surface 332Aa thereof reflects the light emitted from the light source 342 toward the front side. The reflecting surface 332Aa is configured by a plurality of reflecting elements 332As formed by using a rotation parabolic surface, of which the focal point is defined as a light emitting center of the light source 342, as a reference surface, and the reflecting surface 332Aa has a rectangular external shape in the front view of the lamp.

The same is applied to the reflectors 332B and 332C of the remaining two lamp units 320B and 320C. However, the shapes of surfaces of the plurality of reflecting elements 332Bs and 332Cs, which constitute the reflecting surfaces 332Ba and 332Ca, are different from each other.

As a result, the three light distribution patterns, which have different brightness and different sizes, are formed by the light reflected from the respective reflectors 332A to 332C.

The reflector continuous body 330 is configured such that a portion thereof positioned at the upper side of each of the reflectors 332A to 332C, is configured as an upper wall portion 330a that horizontally extends in the vehicle width direction, and the left and right end portions thereof are configured as side wall portions 330b that extend in the vertical direction. Further, the reflector continuous body 330 is configured to have an opening end surface that is formed in a horizontally oblong rectangular shape in the front view of the lamp by the lower front end surface of each of the reflectors 332A to 332C and the front end surfaces of the upper wall portion 330a and the respective side wall portions 330b.

The upper wall portion 330a of the reflector continuous body 330 is disposed at a position spaced, slightly downward, apart from the base member 348 so as not to interfere with the base member 348 when each of the light source units 340A to 340C rotates in the up and down direction. In addition, an opening 330a1 is formed in the upper wall portion 330a so as to expose each of the light sources 342.

The upper wall portion 330a extends to the rear side of each of the reflectors 332A to 332C, and a bracket abutment portion 330c is formed at the rear end portion of the upper wall portion 330a to extend downward so as to cause the reflector continuous body 330 to be abutted on the bracket 350. Further, the reflector continuous body 330 is fixed to the bracket 350 by, for example, screw fastening at a plurality of points of the bracket abutment portion 330c.

An extension member 318 is disposed at the outer peripheral side of the reflector continuous body 330 to cover the reflector continuous body 330 and the three light source units 340A to 340C. The extension member 318 has an opening 318a, which has substantially the same shape as the opening end surface of the reflector continuous body 330 in the front view of the lamp. Further, the rear end portion of the extension member 318 is fixedly supported on the lamp body 312.

Even in the present modified embodiment, the light distribution pattern for a low beam is formed as a synthesized light distribution pattern of the three light distribution patterns, which are formed by the irradiation light from the three lamp units 320A to 320C and have different brightness and different sizes.

Even in the case in which the configuration of the present modified embodiment is adopted, it is possible to collectively adjust the optical axes with respect to the three lamp units 320A to 320C by rotating the bracket 350.

It is possible to correct the misalignment of the optical axes among the lamp units 320A to 320C by rotating the light source units 340A to 340C of the respective lamp units 320A to 320C in the up and down direction with respect to the bracket 350. As a result, it is possible to precisely adjust the optical axes with respect to the three lamp units 320A to 320C.

In that event, since the reflectors 332A to 332C of the respective lamp units 320A to 320C are fixedly supported on the bracket 350 by the reflector continuous body 330, it is possible to prevent the appearance of the vehicular lamp 310 from being impaired without any possibility of causing the positional misalignment of the reflectors 332A to 332C among the lamp units 320A to 320C even though the optical axes of the respective lamp units 320A to 320C are adjusted.

Since the optical axes of the three lamp units 320A to 320C are collectively adjusted in a state in which the misalignment of the optical axes in the up and down direction among the lamp units 320A to 320C is corrected in advance, it is possible to reduce the rotation amount required for adjusting the optical axes. As a result, it is possible to prevent the reflector continuous body 330 and the opening 318a of the extension member 318 from interfering with each other when adjusting the optical axes even though a gap between the reflector continuous body 330 and the opening 318a of the extension member 318 is formed to be comparatively narrow.

In the present modified embodiment, it has been described that the reflectors 332A to 332C of the lamp units 320A to 320C are fixedly supported on the bracket 350 by means of the reflector continuous body 330. However, the respective reflectors 332A, 332B, and 332C may be configured to be fixedly supported on the bracket 350 as independent reflectors.

Next, a fourth modified embodiment of the exemplary embodiment will be described.

Figure 10:
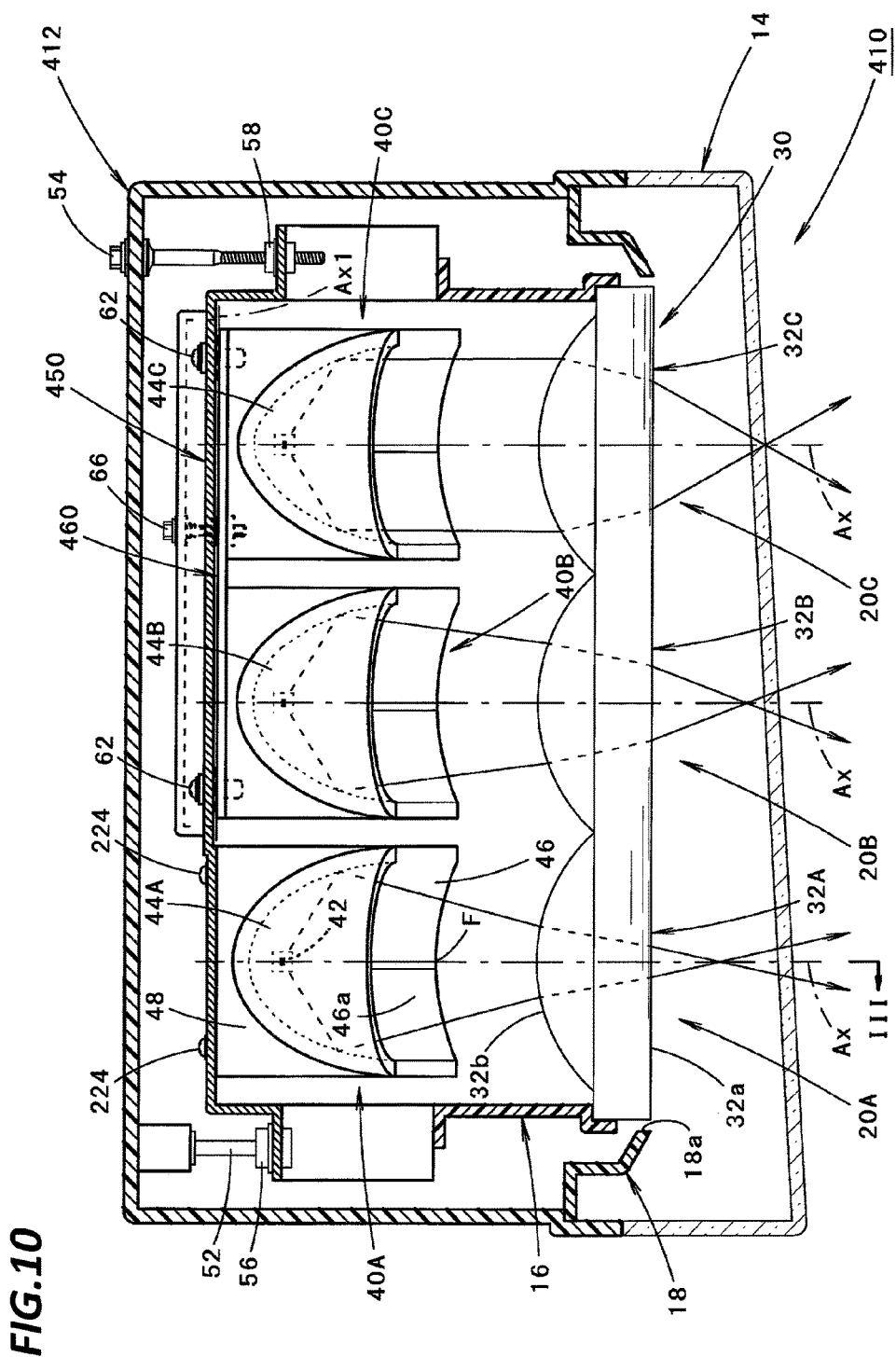
FIG. 10 is a view similar to FIG. 2 and illustrates a fourth modified embodiment of the exemplary embodiment.

FIG. 10 is a view similar to FIG. 2 and illustrates a vehicular lamp 410 according to the present modified embodiment.

As illustrated in FIG. 10, a basic configuration of the vehicular lamp 410 is substantially identical to that of the vehicular lamp 210 according to the second modified embodiment, but differs from the second modified embodiment in that, among the light source units 40A, 40B, and 40C of the three lamp units 20A, 20B, and 20C, the two light source units 40B and 40C, except for the light source unit 40A fixedly supported on a bracket 450, are supported on the bracket 450 through the sub bracket 460 in common.

That is, in the present modified embodiment, a sub bracket 460 is disposed at the front side of the bracket 450. The sub bracket 460 is supported to be rotatable in the up and down direction with respect to the bracket 450 about the rotation axis Ax1 that horizontally extends in the vehicle width direction. In this regard, the sub bracket 460 is fastened to the bracket 450 by screw fastening by screws 62, which are substantially identical to the screws in the second modified embodiment, at two points in the direction in which the rotation axis Ax1 extends, and an adjusting screw 66, which is substantially identical to the adjusting screw in the second modified embodiment and rotates the sub bracket 460 in the up and down direction with respect to the bracket 450 about the rotation axis Ax1, is disposed at a position lower than the sub bracket 460.

Rear end surfaces of the two light source units 40B and 40C are fixedly supported on the sub bracket 460.

Even in the case in which the configuration of the present modified embodiment is adopted, it is possible to adjust the optical axes of the remaining two lamp units 20B and 20C with reference to the optical axis Ax of the lamp unit 20A.

Meanwhile, in the present modified embodiment, it is not possible to correct the misalignment of the optical axes in the up and down direction between the lamp units 20B and 20C.

However, as illustrated in FIG. 5, while the light distribution pattern PA formed by the irradiation light from the lamp unit 20A constitutes a central region of the light distribution pattern PL for a low beam, the light distribution patterns PB and PC formed by the irradiation light from the respective lamp units 20B and 20C constitute a diffusion region of the light distribution pattern PL for a low beam. Therefore, even though the positions of the cutoff lines CL1 and CL2 of the respective light distribution patterns PB and PC are out of alignment from each other in the up and down direction, the synthesized light distribution pattern may be practically used as the light distribution pattern PL for a low beam without any troubles when the positions of the cutoff lines CL1 and CL2 of the respective light distribution patterns PB and PC are collectively displaced to a position below the positions of the cutoff lines CL1 and CL2 of the light distribution pattern PA.

In the case in which the configuration of the present modified embodiment is adopted, it is possible to obtain acting effects that are substantially identical to those obtained in the second modified embodiment while more simplifying the lamp configuration than that in the second modified embodiment.

Next, a fifth modified embodiment of the exemplary embodiment will be described.

Figure 11:
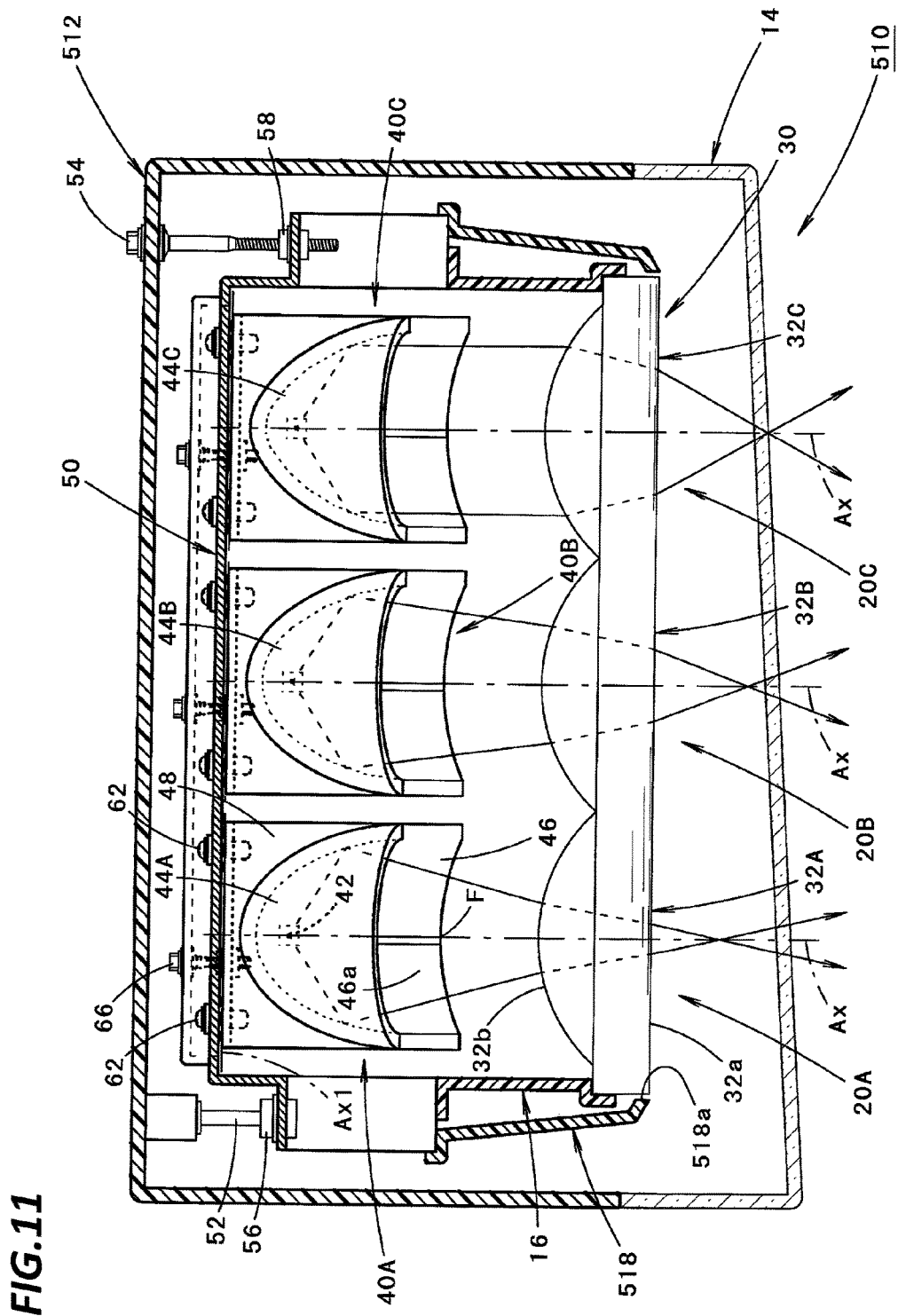
FIG. 11 is a view similar to FIG. 2 and illustrates a fifth modified embodiment of the exemplary embodiment.

FIG. 11 is a view similar to FIG. 2 and illustrates a vehicular lamp 510 according to the present modified embodiment.

As illustrated in FIG. 11, a basic configuration of the vehicular lamp 510 is substantially identical to that of the vehicular lamp 10 according to the exemplary embodiment, but differs from the second modified embodiment in terms of a configuration of an extension member 518, and thus also partially differs from the second modified embodiment in terms of a configuration of a lamp body 512.

That is, the extension member 518 of the present modified embodiment is also disposed to cover the lens holder 16 at the outer peripheral side of the lens holder 16, but the rear end portion of the extension member 518 is fixedly supported on the bracket 50 instead of the lamp body 512.

The extension member 518 has a front end opening 518a that surrounds the transparent member 30 such that a substantially constant gap is formed between the front end opening 518a and the transparent member 30 in the front view of the lamp. However, the gap between the front end opening 518a and the transparent member 30 is set to a smaller value than that in the exemplary embodiment.

As in the present modified embodiment, since the extension member 518 is configured to be fixedly supported on the bracket 50, it is possible to constantly maintain the gap between the transparent member 30 and the extension member 518 regardless of whether the optical axes of the three lamp units 20A to 20C are adjusted or not.

Therefore, it is possible to set a gap between the front end opening 518a of the extension member 518 and the transparent member 30 to a small value, and thus to further improve the appearance of the vehicular lamp 510.

It is also possible to adopt a configuration in which a separate extension member fixedly supported on the lamp body 512 is around the extension member 518 while adopting the configuration of the present modified embodiment.

Numerical values, which are described as a specification in the exemplary embodiment and the modified embodiments of the exemplary embodiment, are merely examples, and the numerical values may of course be appropriately set to different values.

The present disclosure is not limited to the configurations disclosed in the exemplary embodiment and the modified embodiments of the exemplary embodiment, and it is possible to adopt configurations to which various modifications, other than the exemplary embodiment and the modified embodiments of the exemplary embodiment, are made.

What is claimed is:

1. A vehicular lamp comprising:
a plurality of lamp units configured to project irradiation light to form a predetermined light distribution pattern; and
a bracket supported to be rotatable with respect to a lamp body in a vertical direction and a horizontal direction,
wherein the plurality of lamp units is supported on the bracket,
each of the plurality of lamp units includes a light source unit, and a light control member formed with a projection lens and configured to control light emitted from the light source unit,
each of the light source units includes a light source and a reflector,
in at least some of the plurality of lamp units, the light source unit is supported to be rotatable in a vertical direction with respect to the bracket about a rotational axis that horizontally extends between the bracket and the light source unit of each of the plurality of lamp units, and the light control member is fixedly supported on the bracket,
wherein the light source remains fixed relative to the reflector while the light source unit is being rotated in the vertical direction with respect to the bracket about the rotational axis.

2. The vehicular lamp of claim 1, wherein all the light control members of the plurality of lamp units are configured with a plurality of projection lenses, and
the plurality of projection lenses are configured with a single transparent member.

3. The vehicular lamp of claim 2, wherein the single transparent member has a front surface which is configured as a continuous curved or flat surface.

4. The vehicular lamp of claim 3, further comprising:
an extension member configured to be disposed to surround the light control members of the plurality of lamp units,
wherein the extension member is fixedly supported on the bracket.

5. The vehicular lamp of claim 2, further comprising:
an extension member configured to be disposed to surround the light control members of the plurality of lamp units,
wherein the extension member is fixedly supported on the bracket.

6. The vehicular lamp of claim 1, further comprising:
an extension member configured to be disposed to surround the light control members of the plurality of lamp units,
wherein the extension member is fixedly supported on the bracket.

7. The vehicular lamp of claim 1, wherein the light source unit of each of the plurality of lamp units further includes a base member configured to support a light source and a reflector of the light source unit, and
the bracket includes a plurality of projections each having a substantially hemispherical shape and being formed in a direction where the rotational axis of the light source unit extends such that the plurality of projections are contacted with the base member of the light source unit, thereby allowing the light source unit to be rotated in the vertical direction.

8. A vehicular lamp comprising:
a plurality of lamp units configured to project irradiation light to form a predetermined light distribution pattern; and
a bracket supported to be rotatable with respect to a lamp body in a vertical direction and a horizontal direction;
wherein the plurality of lamp units is supported on the bracket,
each of the plurality of lamp units includes a light source unit, and a light control member formed with a reflector which in turn is formed as a continuous body member to be fixedly supported on the bracket and configured to control light emitted from the light source unit,
each of the light source units includes a light source mounted on a base,
in at least some of the plurality of lamp units, the light source unit is supported to be rotatable in a vertical direction with respect to the bracket about a rotational axis that horizontally extends between the bracket and the base of each of the plurality of lamp units,
wherein the light source and the base are radially displaced together as the light source unit is being rotated in the vertical direction with respect to the bracket about the rotational axis.

9. The vehicular lamp of claim 8, wherein the continuous body member includes an upper wall portion having an opening configured to expose the light source.

* * * * *